(12) United States Patent
Tarhonen

(10) Patent No.: US 10,480,517 B2
(45) Date of Patent: Nov. 19, 2019

(54) METHOD OF AND ARRANGEMENT FOR MONITORING THE CONDITION OF A VOLUTE CASING OF A CENTRIFUGAL PUMP

(71) Applicant: Sulzer Management AG, Winterthur (CH)

(72) Inventor: Kalle Tarhonen, Kotka (FI)

(73) Assignee: SULZER MANAGEMENT AG, Winterthur (CH)

( * ) Notice: Subject to any disclaimer, the term of this patent is extended or adjusted under 35 U.S.C. 154(b) by 267 days.

(21) Appl. No.: 15/720,893

(22) Filed: Sep. 29, 2017

(65) Prior Publication Data

US 2018/0119700 A1    May 3, 2018

(30) Foreign Application Priority Data

Oct. 27, 2016    (EP) .................................... 16195981

(51) Int. Cl.
| | |
|---|---|
| *F04D 15/00* | (2006.01) |
| *G01M 13/00* | (2019.01) |
| *F04D 1/00* | (2006.01) |
| *G01H 1/00* | (2006.01) |
| *F04D 7/04* | (2006.01) |
| *F04D 15/02* | (2006.01) |
| *F04D 29/42* | (2006.01) |

(52) U.S. Cl.
CPC .......... *F04D 15/0088* (2013.01); *F04D 1/00* (2013.01); *F04D 7/04* (2013.01); *F04D 15/0272* (2013.01); *F04D 29/428* (2013.01); *G01H 1/00* (2013.01); *G01M 13/00* (2013.01); *F05B 2260/80* (2013.01); *F05B 2270/80* (2013.01)

(58) Field of Classification Search
USPC .......................................... 73/168
See application file for complete search history.

(56) References Cited

U.S. PATENT DOCUMENTS

| | | | |
|---|---|---|---|
| 7,938,617 B2 * | 5/2011 | Naruse | ..................... F04D 1/006 |
| | | | 415/102 |
| 9,062,682 B2 | 6/2015 | Loose et al. | |
| 2013/0243578 A1 | 9/2013 | Wang | |
| 2018/0318482 A1 * | 11/2018 | Timms | ..................... F04D 1/00 |

FOREIGN PATENT DOCUMENTS

| | | |
|---|---|---|
| DE | 19647967 A1 | 5/1998 |
| EP | 2626567 A1 | 8/2013 |

OTHER PUBLICATIONS

Extended European Search Report dated May 15, 2017 in corresponding European Patent Application No. 16195981.2, filed Oct. 27, 2016.

* cited by examiner

*Primary Examiner* — Clayton E. LaBalle
*Assistant Examiner* — Warren K Fenwick
(74) *Attorney, Agent, or Firm* — Global IP Counselors, LLP

(57) ABSTRACT

A method of monitoring the condition of a volute casing of a centrifugal pump, the method includes determining, in a wall of the volute casing, at least one point, which, in view of the material forming the volute casing, is critical to wear, providing, from outside the volute casing, a blind hole in the wall of the volute casing at the at least one point, the blind hole having a depth, receiving information from the blind hole, and taking predetermined actions to replace the volute casing with a new casing after the information indicates the opening of the blind hole into the interior of the volute casing.

18 Claims, 4 Drawing Sheets

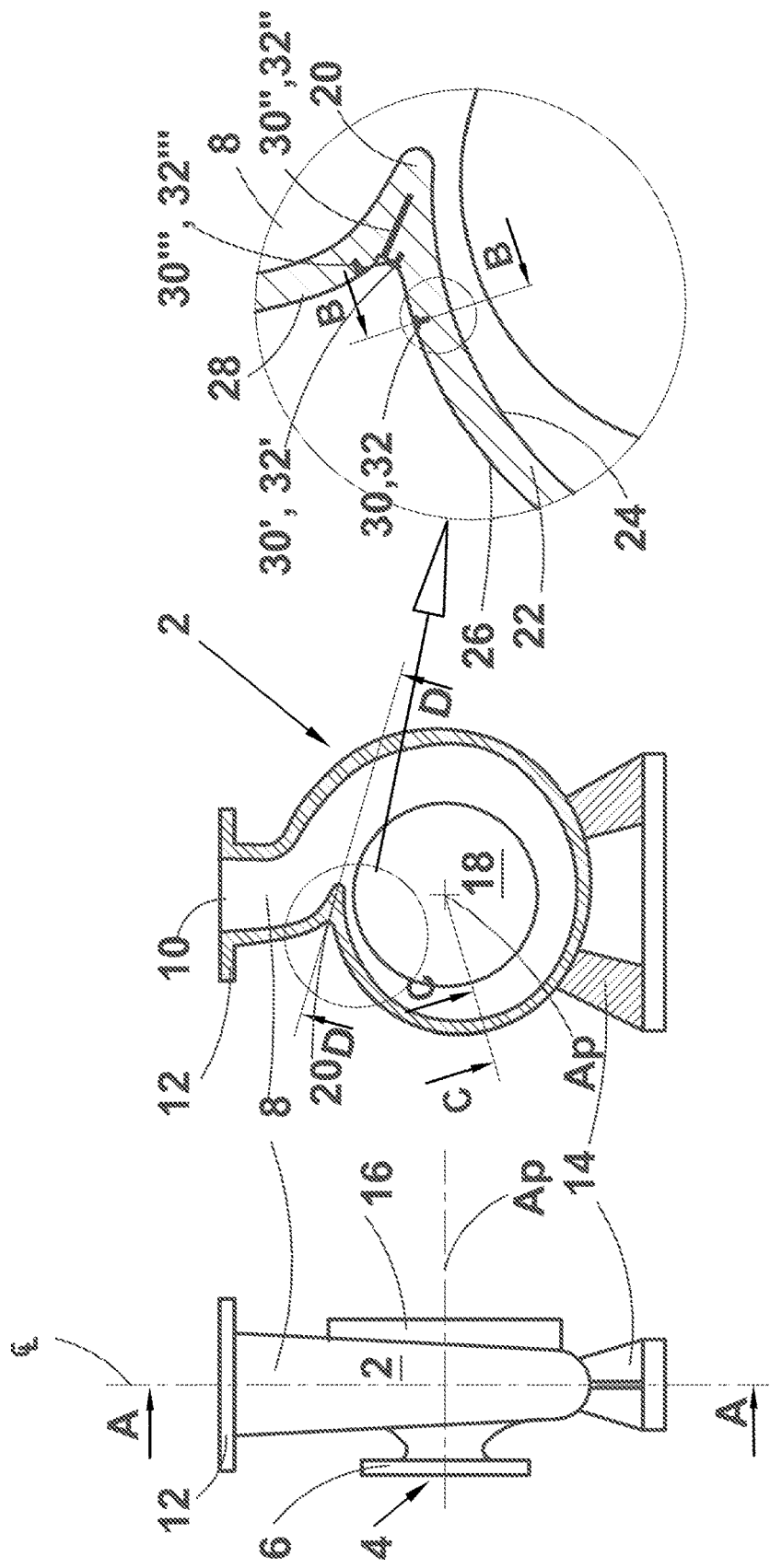

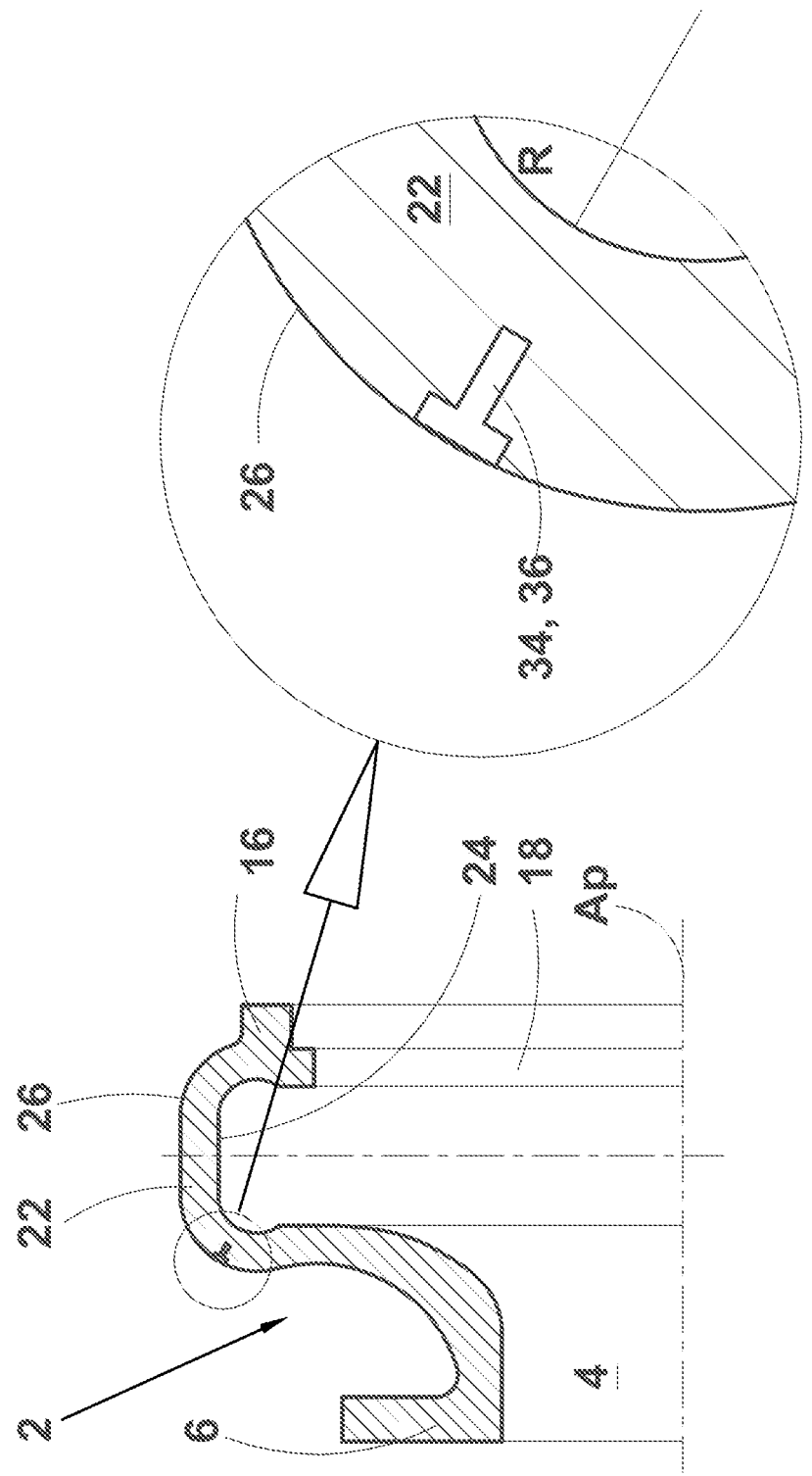

METHOD OF AND ARRANGEMENT FOR MONITORING THE CONDITION OF A VOLUTE CASING OF A CENTRIFUGAL PUMP

CROSS-REFERENCE TO RELATED APPLICATION

This application claims priority to European Application No. 16195981.2, filed Oct. 27, 2016, the contents of which are hereby incorporated herein by reference.

BACKGROUND

Field of the Invention

The present invention relates to a method of and an arrangement for monitoring the condition of a volute casing of a centrifugal pumps. More specifically the present invention relates to monitoring the wear of the volute casing of a centrifugal pump.

Background Information

As long as centrifugal pumps have been used, the components of the pump, mostly the impeller and the volute casing thereof have worn or been abraded. The degree or rate of wear or abrasion has been based on the higher, more abrasive material contained in the liquid to be pumped and/or the weakness (or strength) of the material of the components.

The wear of the impeller appears as a decrease in the performance of the pump, i.e. both the head and the efficiency of the pump drops resulting in the increase in the energy consumption of the pump. Thus, by monitoring the specific energy consumption of the pump the condition of the impeller may be monitored.

The wear of the volute casing affects the performance of the pump but normally less than the impeller wear. Traditionally, the wear of the volute casing has been observed only visually as the pump starts to leak, i.e. a small jet or spray of liquid exits the volute casing. In case the leak or jet cannot be readily observed due to other equipment hiding the pump, a small pond of liquid may be seen below or at a side of the pump indicating wear in the volute casing. As such an open leak is seldom, if ever, a desired feature, and different ways of detecting the beginning leak have been searched for.

U.S. Pat. No. 9,062,682 B2 discusses pump performance monitoring by using either PVDF-(Polyvinylidene Fluoride) based and/or SONAR-based sensors for sensing unsteady pressures and/or acoustic emissions. Both types of sensors are connected to a signal processing module for converting the input signal from a sensor to an output signal containing information about the performance of the pump. The document discusses also briefly the wear of a pump and says that wear is likely to induce vibrations in the pump and cause acoustic emissions. The sensors are of such a type that may be positioned on the pump casing.

Such sensors may operate in a reliable manner in cases where the wear causes some kind of imbalance, like for instance a broken impeller vane does. However, in a case where the wear is based on, for instance, abrasive matter rotating in the volute casing resulting in even wear all over the circumference of the volute casing the wear does not result in unsteady pressures or acoustic emissions until the wear has found its way through the thinnest part of the volute casing. However, such is too late, as the aim should be towards precautionary wear monitoring whereby the service of the volute casing may be timed to take place during customary service outages instead of sudden breakage of the volute casing causing an interruption in the normal production for the period of volute replacement.

SUMMARY

An object of the present invention is to provide such a novel method of and an arrangement for monitoring the wear of a volute casing of a centrifugal pump that overcomes at least some problems of prior art arrangements.

Another object of the present invention is to provide such a novel method of and an arrangement for monitoring the wear of a volute casing of a centrifugal pump that takes into account different types of wear of a centrifugal pump.

Thus one object of the present invention is to provide such a novel method of and an arrangement for monitoring the wear of a volute casing of a centrifugal pump that is specifically aimed at cases where avoiding the leakage caused by local wear is the main concern.

Thus another object of the present invention is to provide such a novel method of and an arrangement for monitoring the wear of a volute casing of a centrifugal pump that is specifically aimed at cases where avoiding the collapse of the strength of the volute casing is the main concern.

Yet another object of the present invention is to provide such a novel method of and an arrangement for monitoring the wear of a volute casing of a centrifugal pump that takes into account different materials the volute casing is made of.

A further object of the present invention is to provide a novel method and an arrangement for monitoring the wear of a volute casing of a centrifugal pump that is made of hard and brittle material.

A still further object of the present invention is to provide a novel arrangement for monitoring the wear of a volute casing of a centrifugal pump that is made of ductile or high-tensile material.

The objects of the invention can be met substantially as is disclosed herein, which describes details of different embodiments of the present invention.

According to an embodiment of the present invention a method of monitoring the condition of a volute casing of a centrifugal pump, the volute casing comprising an outlet duct with a wall and an outlet opening; a centreline plane $C_L$; a cutwater tongue; an axis $A_P$; and a wall having an inner surface defining an interior of the volute casing and an outer surface, comprises the steps of: determining, in the wall of the volute casing, at least one point, which, in view of the material the volute casing is made of, is critical to wear, providing, from outside the volute casing, a blind hole in the wall of the volute casing at said at least one point, the blind hole having a depth, receiving information from the blind hole, and taking predetermined actions to replace the volute casing with a new one after the information having indicated the opening of the blind hole into the interior of the volute casing.

This provides a volute casing for a centrifugal pump the performance and reliability of which are considerably improved.

According to an embodiment of the present invention an arrangement for monitoring the condition of a volute casing of a centrifugal pump, the pump having a volute casing and an axis $A_P$, the volute casing comprising an outlet duct, an outlet opening, a centreline plane $C_L$ running at right angles to the axis $A_P$, a wall having an inner surface defining the interior of the volute casing and an outer surface, and at least one blind hole arranged to extend in a depth in the outer surface of the wall of the volute casing wherein the at least one blind hole is arranged to a position where the principal stress or the abrasion subjected to the volute casing is maximal.

The exemplary embodiments of the present invention discussed in this patent application are not to be interpreted to pose limitations to the applicability of the appended claims. The verb "to comprise" is used in this patent application as an open limitation that does not exclude the existence of also non-recited features. The features recited in dependent claims are mutually freely combinable unless otherwise explicitly stated. The novel features, which are considered as characteristic of the present invention, are set forth in particular in the appended claims.

BRIEF DESCRIPTION OF THE DRAWINGS

The invention will be explained in more detail hereinafter with reference to the drawings.

FIG. 1A illustrates a side view of a volute casing of a centrifugal pump,

FIG. 1B illustrates a radial cross-sectional view of the volute casing of FIG. 1A, the cross-section being taken along the centreline plane of the volute casing running at right angles to the pump axis, i.e. along line A-A of FIG. 1A, FIG. 1C illustrates an enlarged partial view of the volute casing of FIG. 1B in accordance with a first preferred embodiment of the present invention, FIG. 3A illustrates a partial axial cross-section of a volute casing of FIG. 1A in accordance with a second preferred embodiment of the present invention, the cross-section being taken along line C-C of FIG. 1A, FIG. 3B illustrates an enlarged and partial view of the axial cross-section of FIG. 3A

DETAILED DESCRIPTION OF THE EMBODIMENTS

Figure 2A:
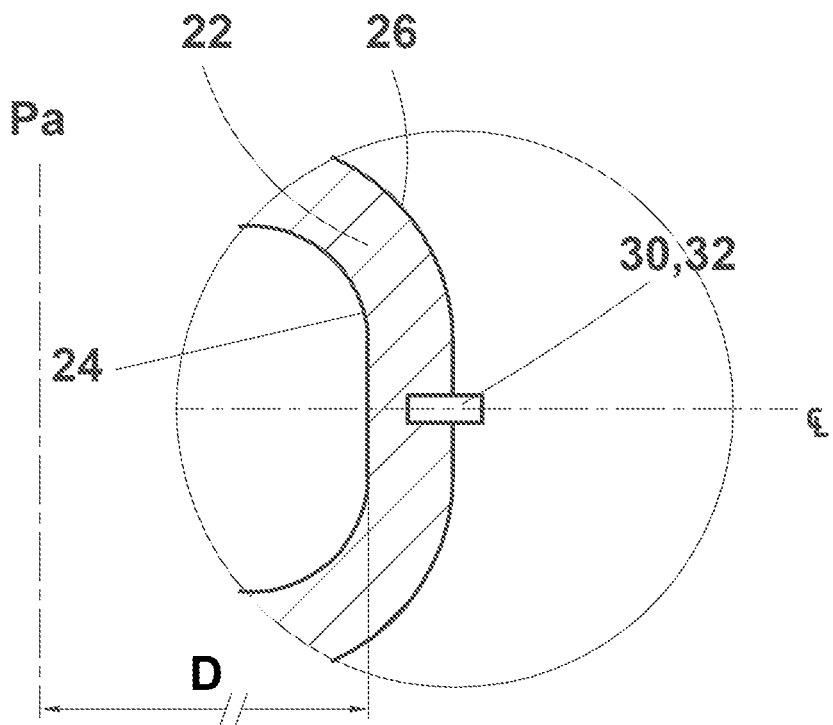
FIG. 2A illustrates an axial cross-sectional view of a non-worn or non-abraded volute casing along line B-B of FIG. 1C.

FIG. 1A illustrates a side view of a volute casing 2 of a centrifugal pump and FIG. 1B illustrates schematically a cross-sectional view of the volute casing of FIG. 1A along line A-A. The volute casing 2 in FIG. 1B is shown as a cross-section viewed from the direction of the inlet opening 4 of the volute casing 2 and taken along a radial centreline plane $C_L$ running at right angles to the pump axis $A_P$. The volute casing 2 has an inlet opening 4 with an inlet flange 6, an outlet duct 8 with an outlet opening 10 surrounded by an outlet flange 12, a support structure, i.e. a foot 14, and an annular flange 16 surrounding an opening 18 via which the impeller of the centrifugal pump may be installed within the volute casing 2. The volute casing 2 has also an axis $A_P$, which coincides with the axis of the shaft of the centrifugal pump when the shaft, the impeller, the volute casing, the bearings and the sealings are assembled to form a centrifugal pump. The inlet opening 4, the inlet flange 6, the annular rear flange 16 and the rear opening 18 therein are positioned concentrically with the axis $A_P$. The volute casing has a centreline plane $C_L$ (often being common with that of the outlet opening 10 and the outlet flange 12) running usually, but not necessarily, at right angles to the axis $A_P$ via the centre of the outlet opening 10. The curved, usually spiral, line formed when the centreline plane $C_L$ crosses the inner wall of the volute casing 2 defines the part of the volute casing 2 usually farthest from the axis $A_P$ of the volute casing 2 (i.e. having the longest distance), whereby the flow velocity of the fluid circulating in the volute casing 2 is at its highest at or near the curved line. The volute casing 2 has further a cutwater tongue 20, which separates a part of the liquid to be pumped at the throat of the volute casing to the outlet duct 8 the rest of the liquid continuing its circulation within the volute casing 2, i.e. in the interior thereof.

FIG. 1C illustrates schematically a partial enlarged view of the volute casing of FIG. 1B in accordance with a first preferred embodiment of the present invention. FIG. 1C thus illustrates the part of the volute casing 2 comprising the cutwater tongue 20 and a part downstream thereof. The word 'downstream' refers to the direction of liquid flow circulating in the volute casing 2 past the cutwater tongue 20. The volute casing 2 has a wall 22 with an inner surface 24 defining the interior of the volute casing and along which the liquid to be pumped flows, and an outer surface 26 in communication with ambient air. The outer surface 26 of the volute casing 2 is, just after, or downstream of, the wall 28 (being also a part of the volute casing) of the outlet duct 8 provided with at least one blind hole 30 arranged at substantially right angles to the outer surface 26 to extend to a certain depth in the wall 22 of the volute casing 2. The blind hole 30 is preferably, but not necessarily, provided with a sensor 32 indicating liquid ingress in the hole 30 from inside the wall 22 of the volute casing 2, i.e. from the interior thereof. FIG. 1C shows a second similar blind hole 30'-sensor 32' pair arranged somewhat upstream of the first one such that the blind hole is positioned at the root of the outlet duct 8. A third blind hole 30"-sensor 32" pair is arranged to extend deep into the cutwater tongue 20. And a fourth blind hole 30'''-sensor 32''' pair is arranged in the wall 28 of the outlet duct 8 for monitoring the wear of the wall of the outlet duct downstream of the cutwater tongue. The blind holes 30, 30', 30" and 30''' are arranged to positions where the abrasive action of the liquid to be pumped is the highest. Extensive performed tests have shown that the position of maximal abrasive stress is the highest where the distance D of the inner surface 24 of the volute casing 2 from the axis $A_P$ in the axial plane (see FIG. 2A) is the longest and resulting in the flow velocity of the fluid being the highest, whereby the centrifugal force pressing the abrasive particles against the inner surface 24 of the volute casing is the highest, too. In ordinary centrifugal pumps such a position is the one shown in FIGS. 1C, 2A and 2B, i.e. close to the cutwater tongue and in near or at the centreline plane $C_L$ of the volute casing 2. However, there are centrifugal pumps where the longest distance D is at a side of the centreline plane $C_L$, i.e. the pumps may have a kind of a double volute with a section having a shorter distance between the two wider volute halves. Or a centrifugal pump may have a, in axial direction, wide volute casing having the distance D of its inner surface growing to an end of the volute casing.

The cutwater tongue forming a part that divides and separates the fluid into two flows is, due to its shape, position and function, the part that is subjected to the most severe wear. As the wear of the cutwater tongue has a significant influence on the efficiency of the centrifugal pump, the cutwater tongue includes the third blind hole 30". In other words, the hole 30", and the sensor 32" possibly positioned therein, do not necessarily monitor the condition of the volute casing in view of breakage or the risk of leakage through the wall of the volute casing but the degree of wear of the cutwater tongue. The hole 30" may be extended in the cutwater tongue to such a position and depth that, when the wear has reached the hole, the flow conditions at the cutwater tongue are weakened to such a degree that the volute casing should be replaced or serviced until more severe reduction of efficiency is at risk. The above discussed and illustrated positions for the blind hole are crucial positions in such pumps that are manufactured of ductile iron or high-tensile steel, like for instance martensitic cast steel ASTM A747 Grade CBCu-2, which allows locally increased stress levels and is, thus, less sensitive to any pressure-related loads. One way to make a distinction between ductile/high-tensile and brittle materials is to determine the percentage of elongation after fracture of the metallic material. EN ISO 6892-1 specifies the method for tensile testing of metallic materials and defines the mechanical properties which can be determined at room temperature. A metallic material whose elongation after fracture is less than 5 may be called brittle, and a material having the elongation after fracture 5 or more is called a ductile or high-tensile material.

However, as such ductile irons or high tensile steels are not especially hard they are sensitive to abrasion. The depth in which the blind holes 30, 30' and 30''' extend is such that they still offer some safety margin until the risk of true leakage through the wall of the volute casing is at hand. I.e. such dimensioning leaves the user sufficient time for arranging the replacement of the worn volute casing with a new one. Naturally, the blind holes may be located such that any leak therefrom is well visible, or the blind holes may be provided with a pipe introducing the leakage to a place where it is easy to detect, or such pipe may be provided with the sensor detecting the presence of liquid. The sensor 32, if used, may be a pressure sensor, a conductivity sensor or some other appropriate sensor. As to the holes themselves, there is no specific dimensioning involved. Naturally, the diameter of the holes is, preferably, as small as possible such that the holes do not reduce the strength of the volute casing. Thus, the hole diameter could be, for instance, 1 tenth of the thickness of the wall of the volute casing or less. The only prerequisite for the hole size is that it has to be able to indicate the leak in a reliable manner whenever it happens.

FIG. 2A illustrates schematically an enlarged view of the axial cross-section of a non-worn or non-abraded volute casing of FIG. 1C in accordance with a first preferred embodiment of the present invention, the cross-section being taken along line B-B of FIG. 1C. FIG. 2A shows how the blind hole 30 and the sensor 32 arranged therein are positioned in the outer surface 26 of the wall 22 of the volute casing in the centreline plane $C_L$ of the volute casing. The part of the volute casing shown here, i.e. the outer circumference thereof is preferably, but not necessarily, symmetrical to the centreline plane $C_L$. FIG. 2A also shows the longest distance D from the inner surface 24 of the volute casing to the axis $A_P$ thereof.

Figure 2B:
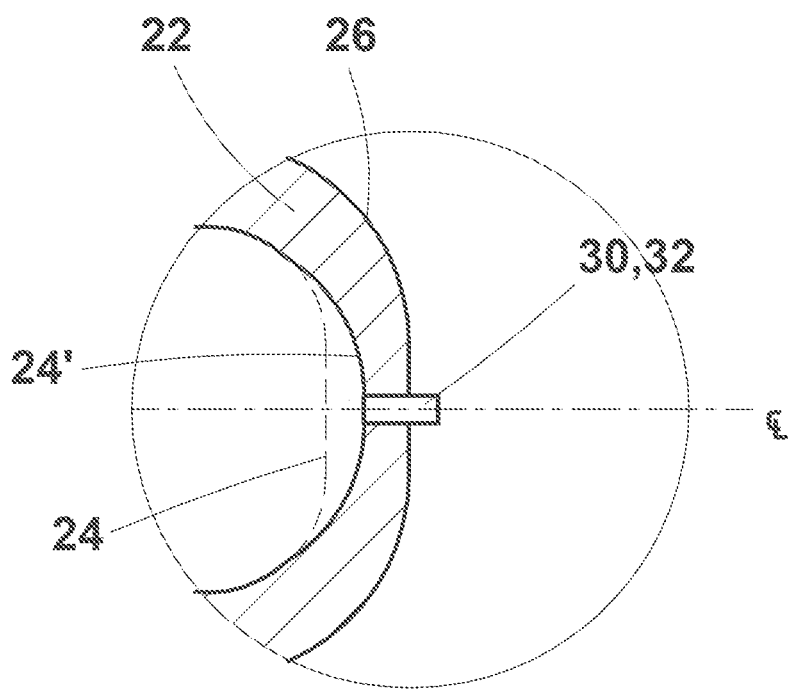
FIG. 2B illustrates an axial cross-sectional view of the volute casing of FIG. 2A worn or abraded to such a degree that the sensor is open to the inside of the volute casing.

FIG. 2B illustrates schematically a view of the volute casing of FIG. 2A worn or abraded to such a condition that the blind hole 30 and the sensor 32, if used, are open to the interior of the volute casing. In other words, the liquid to be pumped, possibly having some abrasive solids entrained therein, circulating along the inner surface 24 of the volute casing has abraded the surface to such a degree that the blind hole 30 has now opened in the inner surface 24' allowing the liquid to enter the hole 30. The sensor 32 in the hole sends a signal to the control unit of the pump, which outputs a request to initiate actions for replacing the worn volute casing with a new one, or for servicing the volute casing some other way. Here, as expected, the highest rate of wear is visible at the centreline plane, as the flow velocity is at its highest at the centreline plane in this kind of a centrifugal pump.

Figure 3C:
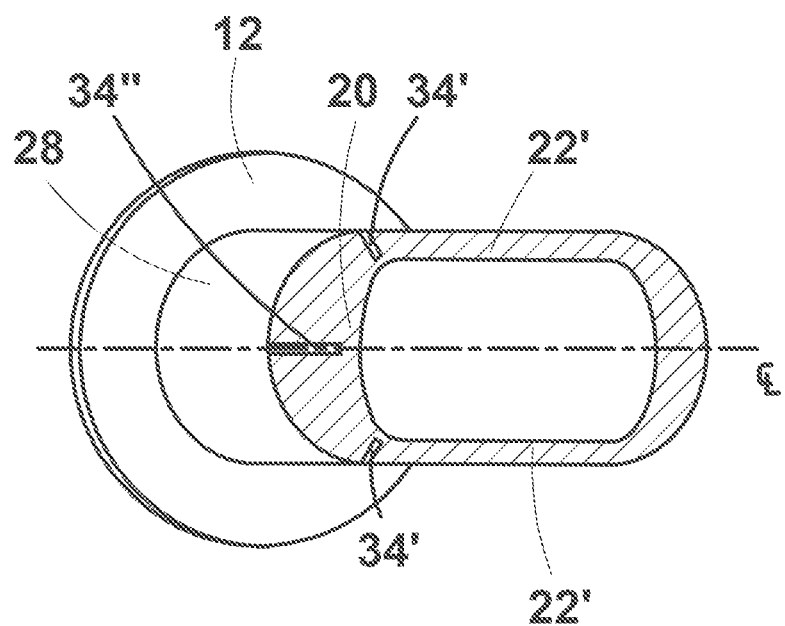
FIG. 3C illustrates a partial cross-section of a volute casing of FIG. 1A in accordance with a second preferred embodiment of the present invention, the cross-section being taken along line D-D of FIG. 1A.

FIGS. 3A and 3B illustrate schematically partial axial cross-sectional views of the volute casing in accordance with a second preferred embodiment of the present invention, the cross-sections being taken along an axial plane C-C (running along the axis $A_p$) of FIG. 1B. FIG. 3C illustrates schematically a partial cross-sectional views of the volute casing, the cross-sections being taken along a plane D-D of FIG. 1B. FIG. 3A shows the volute casing 2 having an inlet opening 4, an inlet flange 6, an annular rear flange 16, a rear opening 18, and a wall 22 with an inner surface 24 and an outer surface 26. In this embodiment the volute casing 2 is made of a hard and brittle material, like for instance cast iron ASTM A532 Class III Type A, in order to better withstand the abrasive action of the liquid to be pumped. The elongation after fracture of this kind of a brittle material is less than 5%. Thus, such a material endures only a very limited amount of elongation (if any) due to the pressure load-induced deformations. Therefore, the blind hole 34 is arranged (possibly, but not necessarily, together with the sensor 36) at substantially right angles to the outer surface 26 of the wall 22 in a position where, in accordance with the performed experiments, the volute casing 2 is subjected to the maximal principal stress. The highest principal stresses are usually found in positions where the radius R of curvature of the inner surface 24 of the volute casing in the shown axial cross section is the smallest. One such position is found in the "corners" of the volute casing 2 where the pressure acting on the inner surface 24 tends to bend the volute casing to increase its radius of curvature in an axial plane. As the same phenomenon takes place over the entire circumference of the volute casing, more than 2, preferably 4 to 12, more preferably 6-8 sensors should be located to the circumference of the volute casing at equal intervals. Another position illustrated in FIG. 3C where the radius of curvature of the surface of the interior of the volute casing may be very small (resulting in the principal stress being high) is the points where the cutwater tongue 20 joins to the opposite walls 22, or actually to the side walls 22' of the volute casing. Such points have been provided in FIG. 3C with blind holes 34' corresponding in their depth, dimension and use to the blind holes 30 . . . 30''' and 34 of the earlier drawings. The blind holes 34' arranged to such positions extend to such a depth that still offers some safety margin until the risk of breaking of the volute casing is at hand. I.e. such dimensioning leaves the user sufficient time for arranging the replacement of the worn volute casing with a new one or servicing the volute casing in an appropriate manner. FIG. 3C shows the blind hole 34" for monitoring the wear of the cutwater tongue 20 at the centreline plane $C_L$ of the volute casing. The blind hole 34" may have the same position as the blind hole 30" of FIG. 1C. When brittle material is in question, the blind hole 34" is located at a position of the maximal principal stress at the centre of the cutwater tongue 20. It is easy to imagine how the pressure tending to push the side walls 22' of the volute casing apart from one another subjects high tensile stresses to both the side corners of the cutwater tongue and at the centre thereof.

The depth of the blind holes above and the safety margins discussed in conjunction therewith are, preferably, defined such that the one who receives the information from the sensor has sufficient time to acquire the volute casing and the service personnel to perform the replacement of the volute casing. Thus, the safety margin may, for instance, mean that the volute casing does not collapse or start to leak until after a week or a month after the alarm, whatever type such may be. Also, based on the rate of wear from the installation of the volute casing to the alarm, the monitoring arrangement may be programmed to give an estimate of the remaining working days of the volute casing.

The use of the above described monitoring arrangement provided with sensors offers various alternatives for performing the condition monitoring of a centrifugal pump. The information from the sensors may be forwarded to at least one of a local (nearby the pump) control room, a centralized control room of the industrial facility the pump is installed in, a centralized spare parts storage of a company and the warehouse of the pump manufacturer, just to name a few options. The information provided by the sensors may be in the form of at least one of a warning light, an audible alarm, an automated message to service personnel and a pre-programmed order for a new volute casing, While the invention has been described herein by way of examples in connection with what are, at present, considered to be the most preferred embodiments, it is to be understood that the invention is not limited to the disclosed embodiments, but is intended to cover various combinations or modifications of its features, and several other applications included within the scope of the invention, as defined in the appended claims. The details mentioned in connection with any embodiment above may be used in connection with another embodiment when such combination is technically feasible.

The invention claimed is:

1. A method of monitoring a condition of a volute casing of a centrifugal pump, the volute casing comprising an outlet duct with a wall and an outlet opening, a centreline plane, a cutwater tongue, an axis, and a wall having an inner surface defining an interior of the volute casing and an outer surface, the method comprising:
   determining, in the wall of the volute casing, at least one point, which, in view of the material forming the volute casing, is critical to wear;
   providing, from outside the volute casing, a blind hole in the wall of the volute casing at the at least one point, the blind hole having a depth;
   receiving information regarding the blind hole; and
   taking predetermined actions to replace the volute casing with a new casing after the information indicates the blind hole opens into the interior of the volute casing.

2. The method as recited in claim 1, wherein, the determining the at least one point includes determining the at least one point for a pump made of a high-tensile steel or ductile iron to such a position in the volute casing that has, in an axial cross section of the volute casing, the longest distance from the axis, the at least one point being where the volute casing subjected to maximal abrasive load.

3. The method as recited in claim 1, wherein, the providing the blind hole includes positioning the blind hole in the wall of the volute casing in close proximity of the cutwater tongue.

4. The method as recited in claim 1, wherein the determining the at least one point includes determining the at least one point for a pump made of a hard and brittle cast iron, at such a position in the volute casing that a radius of the inner surface of the volute casing, in an axial cross section, is smallest, the position being where the volute casing is subjected to maximal principal stress, and the providing, from the outside the volute casing, the blind hole in the wall of the volute casing includes providing the blind hole at the at least one point.

5. The method as recited in claim 1, wherein, the determining the at least one point includes determining the at least one point for a pump made of a hard and brittle cast iron at such a position that the cutwater tongue joins to a side wall of the volute casing, and the providing, from outside the volute casing, the blind hole in the wall of the volute casing includes providing the blind hole at the at least one point.

6. The method as recited in claim 1, wherein, the determining the at least one point includes determining the at least one point for a pump made of a hard and brittle cast iron in the cutwater tongue at the centreline plane of the volute casing, and the providing, from outside the volute casing, the blind hole in the cutwater tongue of the volute casing includes providing the blind hole at the at least one point.

7. The method as recited in claim 1, further comprising, determining the depth of the blind hole to correspond to a smallest safe thickness of the wall of the volute casing in relation to either strength requirements or resistance to wear of the volute casing in the point.

8. The method as recited in claim 1, further comprising determining the depth of the blind hole to correspond to a smallest usable thickness of the wall of the volute casing in view of flow conditions at the cutwater tongue.

9. The method as recited in claim 1, further comprising arranging a sensor in communication with the blind hole, the sensor configured to send a signal when the blind hole opens to the interior of the volute casing.

10. The method as recited in claim 1, wherein, the receiving information includes receiving visual information regarding the blind hole or a signal from a sensor, in communication with the blind hole.

11. An arrangement for monitoring a condition of a volute casing of a centrifugal pump, the pump having a volute casing and an axis, the volute casing comprising an outlet duct, an outlet opening, a centreline plane extending at right angles to the axis, a wall having an inner surface defining an interior of the volute casing and an outer surface, and at least one blind hole arranged to extend in a depth in the outer surface of the wall of the volute casing; the arrangement comprising:
   at least one blind hole arranged in a position where the principal stress or the abrasion subjected to the volute casing is maximal.

12. The arrangement as recited in claim 11, wherein the at least one blind hole is arranged in the volute casing in a position that has, in an axial cross section of the volute casing, a longest distance from the axis.

13. The arrangement as recited in claim 11, wherein the depth of the at least one blind hole is arranged to correspond to a smallest usable thickness of the wall of the volute casing in view of the flow conditions at the cutwater tongue.

14. The arrangement as recited in claim 11, wherein the at least one blind hole is arranged to a position where a radius R of curvature of the inner surface of the wall of the volute casing in an axial cross section of the volute casing is smallest.

15. The arrangement as recited in claim 14, wherein the at least one blind hole includes several blind holes arranged on an entire circumference of the volute casing.

16. The arrangement as recited in claim 14, further comprising a sensor in communication with the at least one blind hole.

17. The arrangement as recited in claim 16, wherein the sensor is one of a pressure sensor and a conductivity sensor.

18. The arrangement as recited in claim 11, wherein the at least one blind hole is arranged at the cutwater tongue at the centreline plane of the volute casing.

* * * * *